United States Patent
Barker et al.

(10) Patent No.: US 12,009,757 B2
(45) Date of Patent: Jun. 11, 2024

(54) RELATING TO BIPOLE POWER TRANSMISSION SCHEMES

(71) Applicant: General Electric Technology GmbH, Baden (CH)

(72) Inventors: Carl Barker, Stafford (GB); Andrzej Adamczyk, Stafford (GB); John Fradley, Stafford (GB)

(73) Assignee: GE INFRASTRUCTURE TECHNOLOGY LLC, Greenville, SC (US)

(*) Notice: Subject to any disclaimer, the term of this patent is extended or adjusted under 35 U.S.C. 154(b) by 84 days.

(21) Appl. No.: 18/053,724

(22) Filed: Nov. 8, 2022

(65) Prior Publication Data

US 2023/0082909 A1  Mar. 16, 2023

(51) Int. Cl.
| | |
|---|---|
| *H02M 7/00* | (2006.01) |
| *H02J 3/38* | (2006.01) |
| *H02M 1/00* | (2006.01) |
| *H02M 7/42* | (2006.01) |
| *H02M 7/54* | (2006.01) |

(52) U.S. Cl.
CPC ............. *H02M 7/00* (2013.01); *H02J 3/381* (2013.01); *H02M 1/0009* (2021.05); *H02M 7/42* (2013.01); *H02M 7/54* (2013.01); *H02J 2300/28* (2020.01)

(58) Field of Classification Search
CPC ............ H02M 7/00; H02M 7/42; H02M 7/54
See application file for complete search history.

(56) References Cited

U.S. PATENT DOCUMENTS

| | | | | |
|---|---|---|---|---|
| 2020/0251906 | A1* | 8/2020 | Jiang-Häfner | ...... H02M 7/7575 |
| 2023/0223759 | A1* | 7/2023 | Babu Narayanan | ...... H02J 3/40 |
| | | | | 307/82 |
| 2023/0318301 | A1* | 10/2023 | Kumar | ...................... H02J 3/48 |
| | | | | 307/82 |

FOREIGN PATENT DOCUMENTS

| | | | |
|---|---|---|---|
| EP | 2713468 A1 | 4/2014 | |
| EP | 4184739 A1 * | 5/2023 | .......... H02J 3/00125 |
| WO | 2016156435 A1 | 10/2016 | |
| WO | 2021234145 A1 | 11/2021 | |

OTHER PUBLICATIONS

EPO search report for corresponding European priority application (2022).*
Extended European Search Report issued in EP Application No. 21275161.4 dated May 2, 2022, 8 pages.

* cited by examiner

*Primary Examiner* — Adi Amrany
(74) *Attorney, Agent, or Firm* — Eversheds Sutherland (US) LLP (57) ABSTRACT

A bipole power transmission scheme includes a first converter station that is positioned, in-use, remote from a second converter station. First and second transmission conduits and a return conduit interconnect, in-use, the first converter station with the second converter station and thereby permit the transfer of power between the first and second converter stations. The first converter station includes a first power converter, a second power converter, and a converter station controller.

12 Claims, 8 Drawing Sheets

RELATING TO BIPOLE POWER TRANSMISSION SCHEMES

TECHNICAL FIELD

This invention relates to a bipole power transmission scheme and to a method of operating such a scheme.

BACKGROUND

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

The choice of the most suitable HVDC power transmission scheme within a HVDC power transmission network differs, depending on the application and scheme features. One type of such scheme is a bipole power transmission scheme.

SUMMARY

According to a first aspect of the invention there is provided a bipole power transmission scheme comprising a first converter station positioned in-use remote from a second converter station, and first and second transmission conduits and a return conduit to in-use interconnect the first converter station with the second converter station and thereby permit the transfer of power between the first and second converter stations, the first converter station including:
a first power converter having a first DC terminal connected with the first transmission conduit, a second DC terminal connected with the return conduit, and at least one first AC terminal electrically connected with a point of common coupling for connection to an AC network element operating at a reference phase angle, the first power converter further having a first converter controller programmed to control the transfer of power between the first transmission conduit and the point of common coupling by having the first power converter provide a first AC voltage at the or each first AC terminal which is presented to the point of common coupling;
a second power converter having a third DC terminal connected with the return conduit, a fourth DC terminal connected with the second transmission conduit, and at least one second AC terminal electrically connected with the point of common coupling, the second power converter further having a second converter controller programmed to control the transfer of power between the second transmission conduit and the point of common coupling by having the second power converter provide a second AC voltage at the or each second AC terminal which is presented to the point of common coupling; and
a converter station controller arranged in operative communication with each of the first and second converter controllers whereby the first and second power converters are controlled as grid forming converters such that the first and second AC voltages presented to the point of common coupling manage the AC frequency and AC voltage at the point of common coupling,
the converter station controller being programmed to operate the first converter station in a current distribution mode in which the distribution of DC current between the first and second transmission conduits is controlled, the converter station controller when operating the first converter station in the current distribution mode being programmed to instruct the first converter controller to adjust the operating phase angle of the first AC voltage provided at the or each first AC terminal in a first direction relative to the reference phase angle at the point of common coupling and instruct the second converter controller to adjust the operating phase angle of the second AC voltage provided at the or each second AC terminal in a second direction opposite the first direction relative to the reference phase angle at the point of common coupling.

Adjusting the operating phase angle of a given AC voltage that, in turn, is presented to the point of common coupling alters the amount of power transferred between the point of common coupling and the corresponding conduit and so, in turn, alters the level of DC current carried by the conduit.

Meanwhile, adjusting the operating phase angle of one AC voltage in a first direction relative to the reference phase angle at the point of common coupling and the operating phase angle of the other AC voltage in a second direction relative to the reference phase angle at the point of common coupling, which is opposite to the first direction, results in the power transferred by one conduit increasing while the power transferred by the other conduit decreases, and hence gives rise to a commensurate increase in the level of DC current carried by one transmission conduit along with a commensurate decrease in the level of DC current carried by the other transmission conduit.

Accordingly, having the converter station controller control the first and second converter controllers to adjust the operating phase angles, of the respective AC voltage which their associated power converter provides to the or each corresponding AC terminal and is then presented to the point of common coupling, in opposite directions to one another desirably enables the share of DC current carried by each transmission conduit to be altered, and hence the distribution of DC current between the first and second transmission conduits to be controlled.

Such control of the distribution of DC current between the first and second transmission conduits is itself advantageous because it can be used to control the magnitude of current flowing in the return conduit. Such control of any return conduit current is beneficial since it can be done, in use, to reduce total power transmission losses between the first and second converter stations, or to minimise the use of the return conduit and any associated return conduit components as a current carrier and thus reduce the need for maintenance and/or replacement of one or more of these elements.

The point of common coupling may be connected with an AC network element in the form of a power source, the first converter controller may be programmed to control the transfer of power from the power source to the first transmission conduit, and the second converter controller may be programmed to control the transfer of power from the power source to the second transmission conduit.

Such an arrangement desirably utilises the invention in connection with a bipole power transmission scheme including a power source, e.g. in the form of a wind park, which are becoming increasing commonplace.

Preferably the converter station controller is programmed to determine the extent of operating phase angle adjustment in each of the first and second directions.

Such a feature helps to ensure that the converter station controller is able to control as desired the amount of DC current flowing in each of the first and second transmission conduits.

Optionally the converter station controller determines the extent of operating phase angle adjustment in each of the first and second directions according to a desired sharing factor.

Having the converter station controller utilise a desired sharing factor provides a degree of control over the proportion of DC current carried by each of the first and second transmission conduits which can be readily implemented within, e.g. a closed-loop.

In a preferred embodiment of the invention the converter station controller:

(i) establishes a first reference current the first power converter is required to provide to the first transmission conduit by applying the desired sharing factor to a sum of measured first and second transmission conduit currents and thereafter establishes a first change instruction for the first power converter based on a comparison of the first reference current with the measured first transmission conduit current; and (ii) establishes a second reference current the second power converter is required to provide to the second transmission conduit by applying a complementary sharing factor to the sum of measured first and second transmission conduit currents and thereafter establishes a second change instruction for the second power converter based on a comparison of the second reference current with the measured second transmission conduit current.

The inclusion of a converter station controller which is programmed in the aforementioned manner is an efficient way of implementing closed-loop control of each of the first and second change instructions, and hence advantageously leads to efficient closed-loop control of each of the first and second power converters.

The complementary sharing factor may be selected to maintain the total amount of power transfer between the point of common coupling and the first and second transmission conduits at the same level during operation of the first converter station in the current distribution mode as the level of power transfer prior to operation of the first converter station in the current distribution mode.

The selection of such a complementary sharing factor desirably ensures that the total amount of power transferred, e.g. from the first and second transmission conduits to a downstream AC network, is maintained during operation of the first converter station in the current distribution mode, and thereby minimises any disruption to users of the downstream AC network while the bipole power transmission scheme of the invention is able to take advantage of the benefits associated with distributing the DC current between the first and second transmission conduits in a desired manner.

In another preferred embodiment of the invention the converter station controller determines the extent of operating phase angle adjustment in each of the first and second directions by establishing a measured return conduit current and driving the measured return conduit current to a desired magnitude.

Having a converter station controller that is programmed in such a way achieves the desired distribution of DC current between the first and second transmission conduits, while being particularly well-suited to minimising the return conduit current, which can have significant environmental benefits as well as being a mandatory normal operating requirement in some installations.

In embodiments in which the power source has an upstream AC network connected in parallel therewith, the converter station controller preferably is additionally programmed, while operating the first converter station in the current distribution mode, to adjust the total amount of power transferred from the power source into the first and second transmission conduits to control the power exchanged with the upstream AC network.

The ability to control the power exchanged with the upstream AC network is advantageous because it can be used to compensate for any AC active power that is exchanged between the power source and the upstream AC network, e.g. in the event of a fault in one transmission conduit and the other transmission conduit being unable to transfer all of the power supplied by the power source, such that some of the supplied power is rejected and has instead to flow into the upstream AC network.

Optionally the converter station controller is programmed to adjust the total amount of power transferred from the power source into the first and second transmission conduits by establishing a measured upstream AC network power transfer and adjusting the total amount of power transferred from the power source into the first and second transmission conduits to drive the measured upstream AC network power transfer to a desired magnitude.

The converter station controller may instead be programmed to adjust the total amount of power transferred from the power source into the first and second transmission conduits by establishing a measured power source output and adjusting the total amount of power transferred from the power source into the first and second transmission conduits to be a desired proportion of the measured power source output.

Each of the converter station controllers programmed as described herein above provides a ready way of achieving the desired control of the power exchanged with the upstream AC network in a closed-loop manner which leads to prompt and efficient power exchange control.

Preferably the converter station controller is additionally programmed to operate the first converter station in a fault recovery mode and switches to operate the first converter station in the current distribution mode after clearance of the fault.

When a fault occurs, e.g. a transmission conduit fault during which the power carried by the conduit temporarily falls to zero, the other transmission conduit maintains, or may even increase, the power it carries (and hence also the DC current flowing therethrough) to compensate for the loss of the other transmission conduit. Once the fault has cleared, i.e. following operation of the first converter station in the fault recovery mode, subsequent switching of the first converter station to operate in the current distribution mode is advantageous because it forces the recovered transmission conduit to retake some DC current, and thereby resume transferring a proportion of the total AC power being transferred.

According to a second aspect of the invention there is provided a method of operating a bipole power transmission scheme comprising a first converter station positioned in-use remote from a second converter station, and first and second transmission conduits and a return conduit to in-use interconnect the first converter station with the second converter station and thereby permit the transfer of power between the first and second converter stations, the first converter station including:
a first power converter having a first DC terminal connected with the first transmission conduit, a second DC terminal connected with the return conduit, and at least one first AC terminal electrically connected with a point of common coupling for connection to an AC network element operating at a reference phase angle, the first power converter further having a first converter controller programmed to control the transfer of power between the first transmission conduit and the point of common coupling by having the first power converter provide a first AC voltage at the or each first AC terminal which is presented to the point of common coupling;

a second power converter having a third DC terminal connected with the return conduit, a fourth DC terminal connected with the second transmission conduit, and at least one second AC terminal electrically connected with the point of common coupling, the second power converter further having a second converter controller programmed to control the transfer of power between the second transmission conduit and the point of common coupling by having the second power converter provide a second AC voltage at the or each second AC terminal which is presented to the point of common coupling; and a converter station controller arranged in operative communication with each of the first and second converter controllers whereby the first and second power converters are controlled as grid forming converters such that the first and second AC voltages presented to the point of common coupling manage the AC frequency and AC voltage at the point of common coupling, the method comprising the step of operating the first converter station in a current distribution mode in which the distribution of DC current between the first and second transmission conduits is controlled by having the converter station controller instruct the first converter controller to adjust the operating phase angle of the first AC voltage provided at the or each first AC terminal in a first direction relative to the reference phase angle at the point of common coupling and instruct the second converter controller to adjust the operating phase angle of the second AC voltage provided at the or each second AC terminal in a second direction opposite the first direction relative to the reference phase angle at the point of common coupling.

The method of the invention shares the benefits of the corresponding features of the bipole power transmission scheme of the invention.

It will be appreciated that the use of the terms "first" and "second", and the like, in this patent specification is merely intended to help distinguish between similar features (e.g. the first and second transmission conduits, and the first and second power converters), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
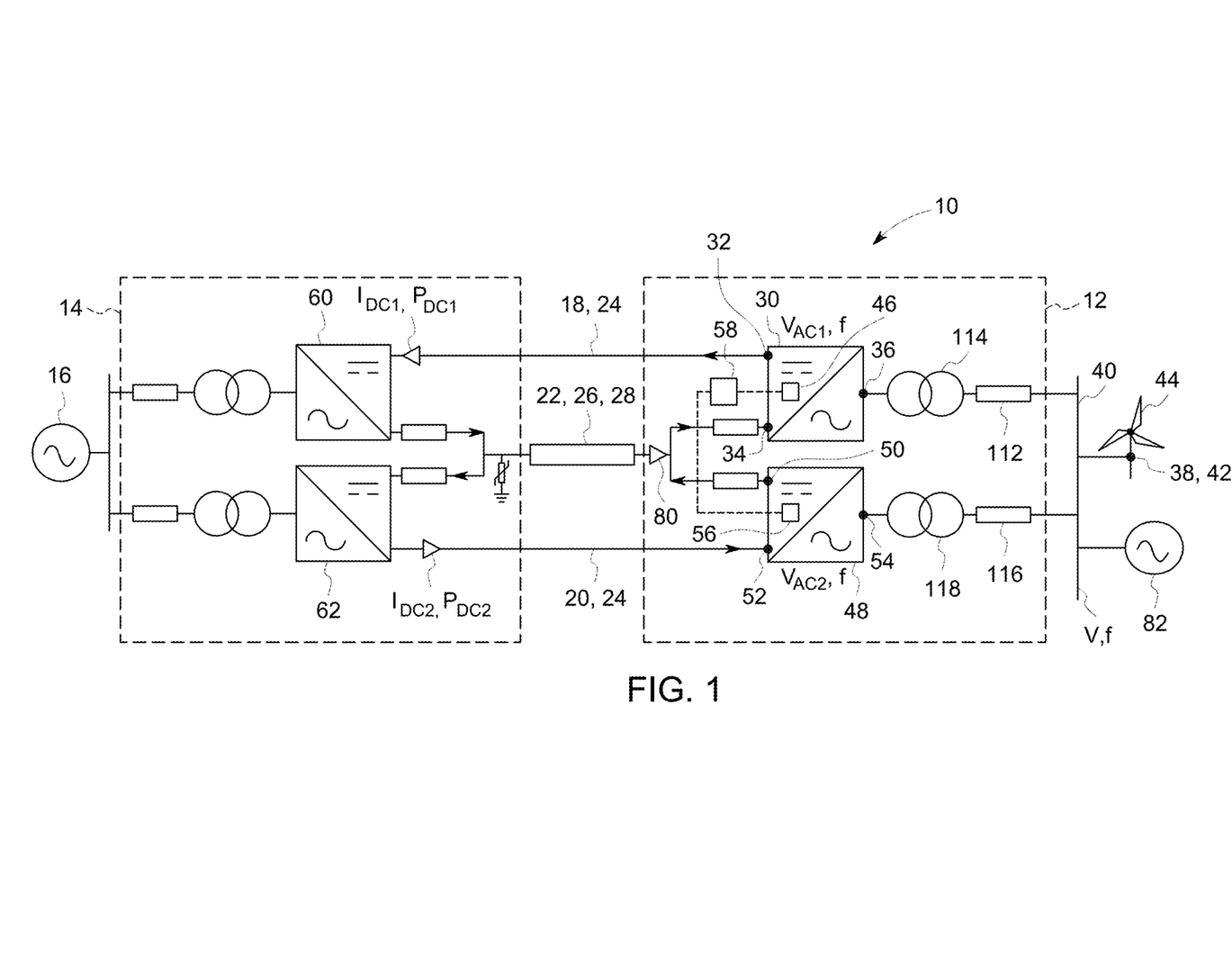
FIG. 1 shows a schematic view of a bipole power transmission scheme according to a first embodiment of the invention.

A bipole power transmission scheme according to a first embodiment of the invention is designated generally by reference numeral 10, as shown in FIG. 1.

The bipole power transmission scheme 10 includes a first converter station 12 which is positioned remotely from a second converter station 14. In the embodiment shown both converter stations 12, 14 are onshore converter stations, although in other embodiments of the invention this need not necessarily be the case. Moreover, in the embodiment shown the bipole power transmission scheme 10 of the invention includes the second converter station 14, but other embodiments of the invention may include only the first converter station 12. Such other embodiments of the invention may be applicable when a third party owns or manages the second converter station 14 and a downstream AC network 16, i.e. a downstream power transmission network, associated therewith, or indeed owns multiple second converter stations having respective downstream power transmission networks associated therewith which together form part of a multi-terminal HVDC power transmission network, and it is intended for the bipole power transmission scheme of the invention to interoperate with the or each such other second converter stations and associated downstream AC networks.

Returning to the embodiment shown, the first and second converter stations 12, 14 are interconnected by first and second transmission conduits 18, 20, i.e. first and second 'poles' (hence the scheme constituting a 'bipole' scheme), and a return conduit 22, which permit the transfer of power between the first and second converter stations 12, 14, and more particularly in the embodiment shown, permit the first converter station 12 to transmit power to the second converter station 14.

Each of the first and second transmission conduits 18, 20 is or includes an overhead line 24, although in other embodiments of the invention one or other transmission conduit might be, or include, a subsea cable, an underground cable, or a mixture of such cables and line.

Meanwhile, the return conduit 22 is or includes a dedicated metallic return 26, which typically takes the same form as the first and second transmission conduits 18, 20, i.e. a further overhead line 28, although an electrical conductor of some other form may be used as well as the ground itself.

The first converter station 12 includes a first power converter 30 which has a first DC terminal 32 that is connected with the first transmission conduit 18 and a second DC terminal 34 which is connected with the return conduit 22.

The first converter 30 also includes three first AC terminals, although for clarity only one first AC terminal 36 is shown schematically in FIG. 1. Each first AC terminal 36 corresponds to a respective phase of an AC network element in the form of a power source 38 with which the first AC terminals 36 are electrically connected via a point of common coupling 40. In the embodiment shown the power source 38 is an onshore wind park 42 which includes a plurality of wind turbines 44, although other power sources are also possible. In any event, the AC network element operates at a reference phase angle which therefore is apparent, i.e. measurable, at the point of common coupling 40.

In addition to the foregoing, the first power converter 30 also has a first converter controller 46 which is programmed to control the transfer of power between the point of common coupling 40 and the first transmission conduit 18 and, more particularly in the embodiment shown, control the transfer of power from the power source 38 into the first transmission conduit 18. In other embodiments of the invention (not shown) the first converter controller may control the transfer of power from the first transmission conduit to the point of common coupling and on to some other form of AC network element connected with the point of common coupling.

The first power converter 30 shown is a voltage source converter, although other types of power converter can be used.

The voltage source converter shown has a known configuration which includes three converter limbs that extend between the first and second DC terminals 32, 34, and which correspond to the three phases of the power source 38. Each converter limb includes first and second limb portions which are separated by a corresponding first AC terminal 36 (only one of which is shown for simplification purposes).

Each limb portion includes a chain-link converter that extends between the associated AC terminal 36 and a corresponding one of the first or the second DC terminal 32, 34. Each chain-link converter includes a plurality of series connected chain-link modules, while each chain-link module includes a number of switching elements which are connected in parallel with an energy storage device in the form of a capacitor (although other types of energy storage device, i.e. any device that is capable of storing and releasing energy to selectively provide a voltage, e.g. a fuel cell or battery, may also be used however).

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at each AC terminal 36, whereby the first power converter 30 is able to provide a first AC voltage $V_{AC1}$ at each first AC terminal 36, which is presented to the point of common coupling 40, e.g. via some form of circuit impedance such as the leakage reactance 112 of a first transformer 114, and thereby provides the aforementioned power transfer functionality, i.e. the transfer of power from the power source 38, i.e. the onshore wind park 42, into the first transmission conduit 18.

The first converter station 12 also includes a second power converter 48 which, in the embodiment shown, is also a voltage source converter that is configured in essentially the same manner as the first power converter 30 as described hereinabove, although this need not necessarily be the case.

The second power converter 48 does, however, have a third DC terminal 50 that is connected with the return conduit 22, as well as a fourth DC terminal 52 which is connected with the second transmission conduit 20.

The second power converter 48 similarly includes three second AC terminals, although only one such second AC terminal 54 is shown for the sake of clarity. The three AC terminals 54 are electrically connected with the power source 38 via the point of common coupling 40.

Additionally, the second power converter 48 has a second converter controller 56 which is similarly programmed to control the transfer of power between the point of common coupling 40 and the second transmission conduit 20. More particularly, the second power converter 48 is similarly configured so that respective chain-link converters generate an AC voltage waveform at each second AC terminal 54, whereby the second power converter 48 presents a second AC voltage $V_{AC2}$ to the point of common coupling 40, e.g. again via some form of circuit impedance such as the leakage reactance 116 of a second transformer 118, and thereby facilitates transfer of power from the power source 38, i.e. the onshore wind park 42, into the second transmission conduit 20. In other embodiments of the invention (not shown) the second converter controller may control the transfer of power from the second transmission conduit to the point of common coupling and on to, e.g. a further AC network connected therewith.

The first converter station 12 still further includes a converter station controller 58 which is arranged in operative communication with each of the first and second converter controllers 46, 56 whereby the first and second power converters 30, 48 are controlled as grid forming converters, such that the first and second AC voltages $V_{AC1}$, $V_{AC2}$ presented to the point of common coupling 40 manage the AC frequency f and AC voltage V at the point of common coupling 40.

Meanwhile, in the embodiment shown the second converter station 14 includes third and fourth power converters 60, 62 which are also voltage source converters, essentially configured in the same manner as the first and second power converters 30, 48 in the first converter station 12, albeit in a mirror image fashion. Other types of power converter, as well as other configurations of power converter, may however be included instead in the second converter station 14. The third and fourth power converters 60, 62 are configured to transfer power from the first and second transmission conduits 18, 20 to the downstream AC network 16, although other downstream network arrangements are possible.

Returning to the first converter station 12, its converter station controller 58 is programmed to operate the first converter station 12 in a current distribution mode in which the distribution of DC current between the first and second transmission conduits 18, 20 is controlled.

The converter station controller 58, when operating the first converter station 12 in the aforesaid current distribution mode, is programmed to instruct the first converter controller 46 to adjust the operating phase angle of the first AC voltage $V_{AC1}$ provided at each first AC terminal 36 in a first direction relative to the reference phase angle of the power source 38, i.e. onshore wind park, 42, connected with the point of common coupling 40, and to instruct the second converter controller 56 to adjust the operating phase angle of the second AC voltage $V_{AC2}$ provided at each second AC terminal 54 in a second direction, opposite the first direction, relative to the reference phase angle at the point of common coupling 40.

More particularly, the converter station controller 58 is programmed to determine the extent of operating phase angle adjustment in each of the first and second directions, and in the embodiment shown does so according to a desired sharing factor D.

Figure 2:
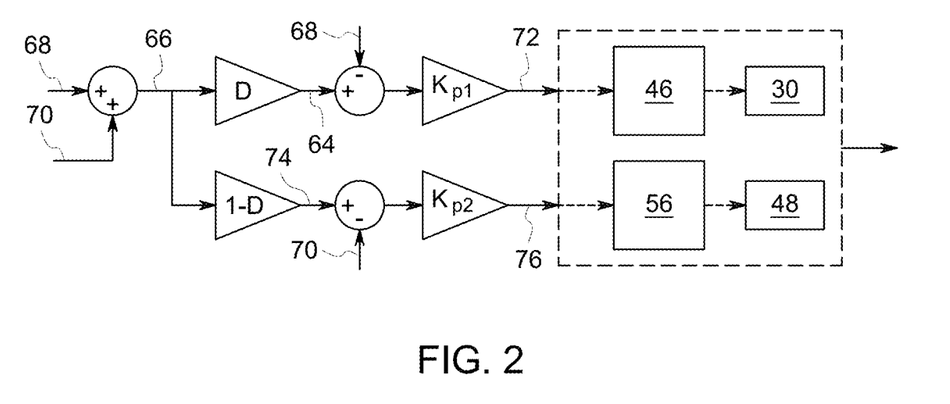
FIG. 2 shows a schematic view of one way in which a converter station controller forming a part of the bipole power transmission scheme shown in FIG. 1 may be programmed to determine the extent of operating phase angle adjustment for first and second power converters within a first converter station of the said bipole power transmission scheme.

More particularly still, the converter station controller 58 may be programmed to implement a control algorithm of the closed-loop form shown schematically in FIG. 2.

In that regard, the converter station controller 58 may be programmed to establish a first reference current 64 that the first power converter 30 is required to provide to the first transmission conduit 18. The converter station controller 58 does so by applying the desired sharing factor D to a sum 66 of a measured first transmission conduit current 68, i.e. the actual, measured DC current $I_{DC1}$ flowing in the first transmission conduit 18, and a measured second transmission conduit current 70, i.e. the actual, measured DC current $I_{DC2}$ flowing in the second transmission conduit 20. In this embodiment the sharing factor D has a value between 0 and 1, although this need not necessarily be the case.

The converter station controller 58 then establishes a first change instruction in the form of a first frequency change instruction 72 for the first power converter 30 which is based on, i.e. derived from, a comparison of the first reference current 64 with the measured first transmission conduit current 68. Such derivation optionally includes multiplication by a first scaling factor, or 'gain', $K_{p1}$, although this need not necessarily be the case.

The converter station controller 58 sends the first frequency change instruction 72 to the first converter controller 46 which, in turn, utilises that first instruction 72 to create its own, local instructions to alter operation of the first power converter 30, e.g. to alter operation of the individual chain-link converters therein when the first power converter 30 is a voltage source converter, in order that the first power converter 30 adjusts the phase angle of the first AC voltage $V_{AC1}$ provided at the first AC terminals 36, and which in turn is presented to the point of common coupling 40, e.g. by the first transformer 114, to a desired extent and in a desired direction, relative to the reference phase angle at the point of common coupling 40.

In other embodiments of the invention (not shown) the converter station controller 58 may additionally integrate the first frequency change instruction to produce a change instruction in the form of a phase change instruction, which is instead passed to the first converter controller 46 directly.

The converter station controller 58 also establishes a second reference current 74 that the second power converter 48 is required to provide to the second transmission conduit 20. The converter station controller 58 similarly does so by applying a complementary sharing factor 1-D to the sum 66 of measured first and second transmission conduit currents 68, 70.

Thereafter the converter station controller 58 again similarly establishes a second change instruction in the form of a second frequency change instruction 76 for the second power converter 48 which is based on, i.e. derived from, a comparison of the second reference current 74 with the measured second transmission conduit current 70. Again, such derivation similarly optionally includes multiplication by a second scaling factor, or 'gain', $K_{p2}$, although this need not necessarily be the case.

The converter station controller 58 again similarly then sends the second frequency change instruction 76 to the second converter controller 56 which, in turn, utilises that second instruction 76 to create its own, local instructions to alter operation of the second power converter 48, e.g. to alter operation of the individual chain-link converters therein, in order that the second power converter 48 similarly adjusts the phase angle of the second AC voltage $V_{AC2}$ provided at the second AC terminals 54, and which in turn is presented to the point of common coupling 40 to a desired extent and in a desired direction, relative to the reference phase angle at the point of common coupling 40.

In other embodiments of the invention (not shown) the converter station controller 58 may, similarly additionally integrate the second frequency change instruction to product a second change instruction in the form of a second phase change instruction, which is instead passed to the second converter controller 56 directly.

In each instance, the converter station controller 58 achieves phase angle adjustment of the respective first and second AC voltages $V_{AC1}$, $V_{AC2}$ in practice by causing a voltage controlled oscillator therein (not shown) to "accelerate" or "decelerate" its output to affect the first and second frequency change instructions 72, 76 accordingly, i.e. accelerate its output to increase the corresponding phase angle or decelerate its output to decrease the corresponding phase angle.

Meanwhile, in the embodiment illustrated schematically in FIG. 2, the complementary sharing factor 1-D is selected, in the case where D has a value between 0 and 1, to maintain the total amount of power transfer from the power source 38 into the first and second transmission conduits 18, 20 at the same level during operation of the first converter station 12 in the current distribution mode as the level of power transfer prior to operation of the first converter station 12 in the current distribution mode.

Figure 3A:
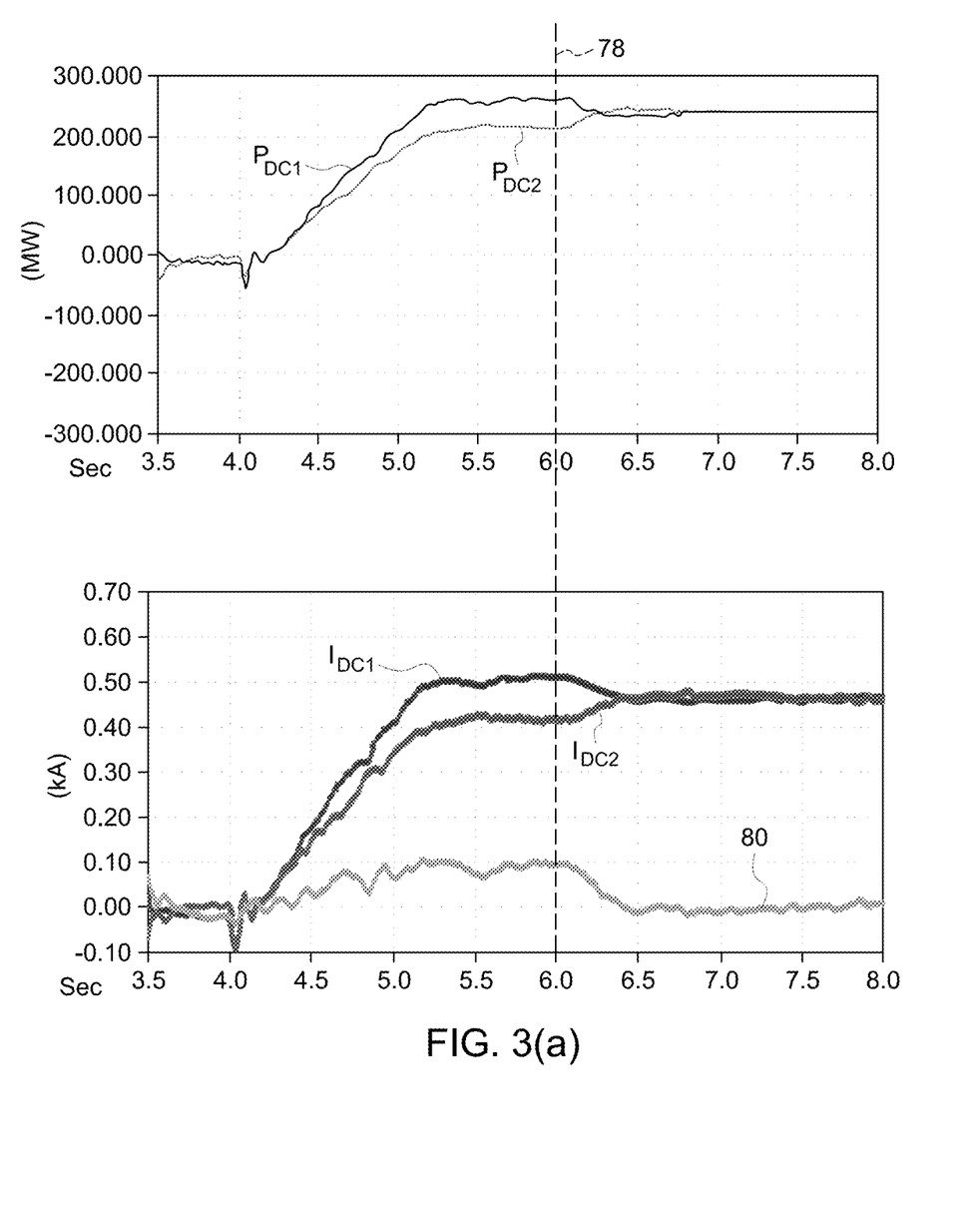
FIGS. 3(a) and 3(b) illustrate different distributions of DC current and DC power between first and second transmission conduits of the bipole power transmission scheme shown in FIG. 1.

For example, a share factor D which is equal to 0.5 would result in a complementary share factor 1-D that is also equal to 0.5, such that the resulting changes to the phase angles of the first and second AC voltages $V_{AC1}$, $V_{AC2}$ presented to the point of common coupling 40 would give rise to the DC current $I_{DC1}$ flowing in the first transmission conduit 18 being the same magnitude as the DC current $I_{DC2}$ flowing in the second transmission conduit 20, i.e. each transmission conduit 18, 20 carrying half of the total DC current, as shown in FIG. 3(a).

More particularly FIG. 3(a) shows that, upon the converter station controller 58 operating the first converter station 12 in the current distribution mode 78 (at a time of 6 seconds), adjusting the operating phase angle of the first AC voltage $V_{AC1}$ presented to the point of common coupling 40 in a first direction, e.g. to increase the said phase angle, results in the DC current $I_{DC1}$ flowing in the first transmission conduit 18 reducing, and adjusting the operating phase angle of the second AC voltage $V_{AC2}$ presented to the point of common coupling 40 in a second direction opposite the first direction, e.g. to decrease the said phase angle by an equal but amount, results in the DC current $I_{DC2}$ flowing in the second transmission conduit 20 increasing to the same magnitude as the DC current $I_{DC1}$ flowing in the first transmission conduit 18.

Incidentally, having the same magnitude of DC current $I_{DC1}$, $I_{DC2}$ flowing in each of the first and second transmission conduits 18, 20 leads to a transfer of essentially the same magnitude of power $P_{DC1}$ by the first transmission conduit 18 as the magnitude of power $P_{DC2}$ transferred by the second transmission conduit 20 when operating at equal but opposite DC voltages, while the total amount of power transferred by the first and second transmission conduits 18, 20 together remains essentially the same.

Also, having the same magnitude of DC current $I_{DC1}$, $I_{DC2}$ flowing in each of the first and second transmission conduits 18, 20 gives rise to a return conduit current 80 of essentially zero.

Figure 3B:
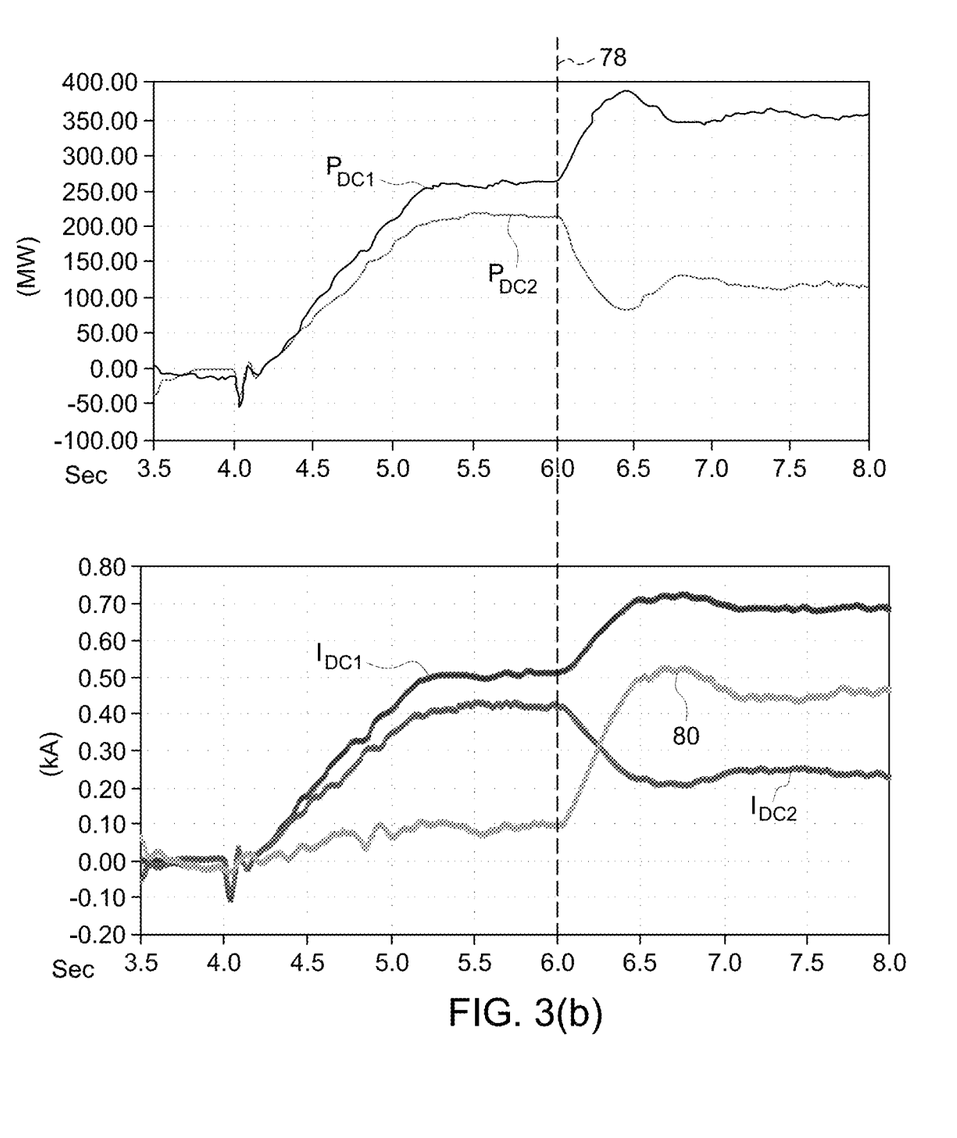

In contrast, as illustrated in FIG. 3(b), a share factor D which is equal to 0.75 results in a complementary share factor 1-D that is equal to 0.25, such that the resulting changes to the phase angles of the first and second AC voltages $V_{AC1}$, $V_{AC2}$ presented to the point of common coupling 40 give rise to a 75/25 sharing ratio between the DC current $I_{DC1}$ flowing in the first transmission conduit 18 and the DC current $I_{DC2}$ flowing in the second transmission conduit 20, i.e. approximately 75% of the total DC current flowing as a first DC current $I_{DC1}$ in the first transmission conduit 18 and approximately 25% of the total DC current flowing as a second DC current $I_{DC2}$ in the second transmission conduit 20.

More particularly FIG. 3(b) similarly shows that, upon the converter station controller 58 operating the first converter station 12 in the current distribution mode 78 (at a time of 6 seconds), adjusting the operating phase angle of the first AC voltage $V_{AC1}$ presented to the point of common coupling 40 in a different first direction, e.g. to decrease the said phase angle, results in the first DC current $I_{DC1}$ flowing in the first transmission conduit 18 increasing to approximately 0.75 kA, and adjusting the operating phase angle of the second AC voltage $V_{AC2}$ presented to the point of common coupling 40 in a different second direction opposite the first direction, e.g. to increase the said phase angle by an equal but opposite amount, results in the second DC current $I_{DC2}$ flowing in the second transmission conduit 20 decreasing to approximately 0.25 kA.

These operating phase angle adjustments and the resulting changes to the magnitude of first and second DC currents $I_{DC1}$, $I_{DC2}$ flowing in the first and second transmission conduits 18, 20 have a commensurate impact on the power transferred by each of the first and second transmission conduits 18, 20, with the first power transmission conduit 18 transferring a first power $P_{DC1}$ which is about three times greater than a second power $P_{DC2}$ transferred by the second transmission conduit 20 when operating at equal but opposite DC voltage, while the total amount of power transferred remains essentially the same as prior to operation of the first converter station 12 in the current distribution mode.

Additionally, having different magnitude first and second DC currents $I_{DC1}$, $I_{DC2}$ flowing in the first and second transmission conduits 18, 20 results in a non-negligible return conduit current 80 of about 0.5 kA.

In other embodiments of the invention (not shown) the converter station controller 58 may be programmed to determine the extent of operating phase angle adjustment in each of the first and second directions by establishing a measured return conduit current 80 and driving the measured return conduit current to a desired magnitude, i.e. by adjusting the operating phase angle of each of the first and second AC voltages $V_{AC1}$, $V_{AC2}$ presented to the point of common coupling 40 in opposite directions, e.g. to increase one and decrease the other, so as to cause a corresponding respective increase or decrease in the first and second DC currents $I_{DC1}$, $I_{DC2}$ flowing respectively in the first and second transmission conduits 18, 20 and thereby alter the measured return conduit current 80 to the desired level.

Returning to the bipole power transmission scheme 10 shown in FIG. 1, the power source 38 is connected in parallel with a further AC network element in the form of an upstream AC network 82.

Accordingly, in further embodiments of the invention the converter station controller 58 may be additionally programmed, while operating the first converter station 12 in the current distribution mode, to adjust the total amount of power transferred from the power source 38 into the first and second transmission conduits 18, 20 in order to control the power exchanged with the upstream AC network 82.

Figure 4:
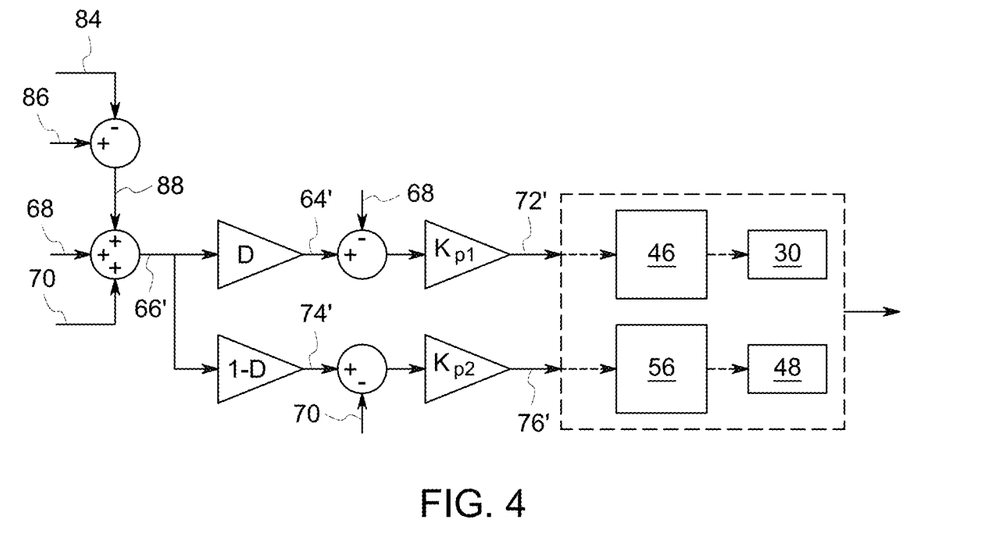
FIG. 4 shows a schematic view of another way in which the converter station controller may be programmed to determine the extent of operating phase angle adjustment for first and second power converters within the first converter station of the said bipole power transmission scheme.

On way in which the converter station controller 58 may be so additionally programmed is by implementing a control algorithm of the closed-loop form shown schematically in FIG. 4.

The control algorithm shown in FIG. 4 is very similar to the control algorithm shown in FIG. 2, and like elements share the same reference numerals.

The FIG. 4 algorithm differs, however, in that it additionally establishes a measured upstream AC network power transfer 84, i.e. the actual, measured power exchanged with the upstream AC network 82, and then adjusts the total amount of power transferred from the power source 38 into the first and second transmission conduits 18, 20 to drive the measured upstream AC network power transfer 84 to a desired magnitude, e.g. to drive the measured upstream AC network power transfer 84 to equal a desired power transfer reference 86.

More particularly, the converter station controller 58 is programmed to subtract the measured upstream AC network power transfer 84 from the desired power transfer reference 86 to obtain a power transfer error value 88, which the converter station controller 58 then adds to the measured first and second transmission conduit currents 68, 70 to obtain a revised sum 66'.

The converter station controller 58 is programmed to then establish a revised first reference current 64' (that the first power converter 30 is required to provide to the first transmission conduit 18) by applying a desired sharing factor D to the revised sum 66' to establish a revised first frequency change instruction 72' for the first power converter 30 which is again based on, i.e. derived from, a comparison of the revised first reference current 64' with the measured first transmission conduit current 68. The converter station controller 58 sends the revised first frequency change instruction 72' to the first converter controller 46 which, in turn, adjusts the phase angle of the first AC voltage $V_{AC1}$ presented to the point of common coupling 40 to a desired extent and in a desired direction.

The converter station controller 58 also similarly establishes a revised second reference current 74' (that the second power converter 48 is required to provide to the second transmission conduit 20) by applying a complementary sharing factor 1-D to the revised sum 66' to establish a revised second frequency change instruction 76' for the second power converter 48 which is again based on, i.e. derived from, a comparison of the revised second reference current 74' with the measured second transmission conduit current 70. The converter station controller 58 again similarly then sends the revised second frequency change instruction 76' to the second converter controller 56 which, in turn, adjusts the phase angle of the second AC voltage $V_{AC2}$ presented to the point of common coupling 40 to a desired extent and in a desired direction.

Figure 5A:
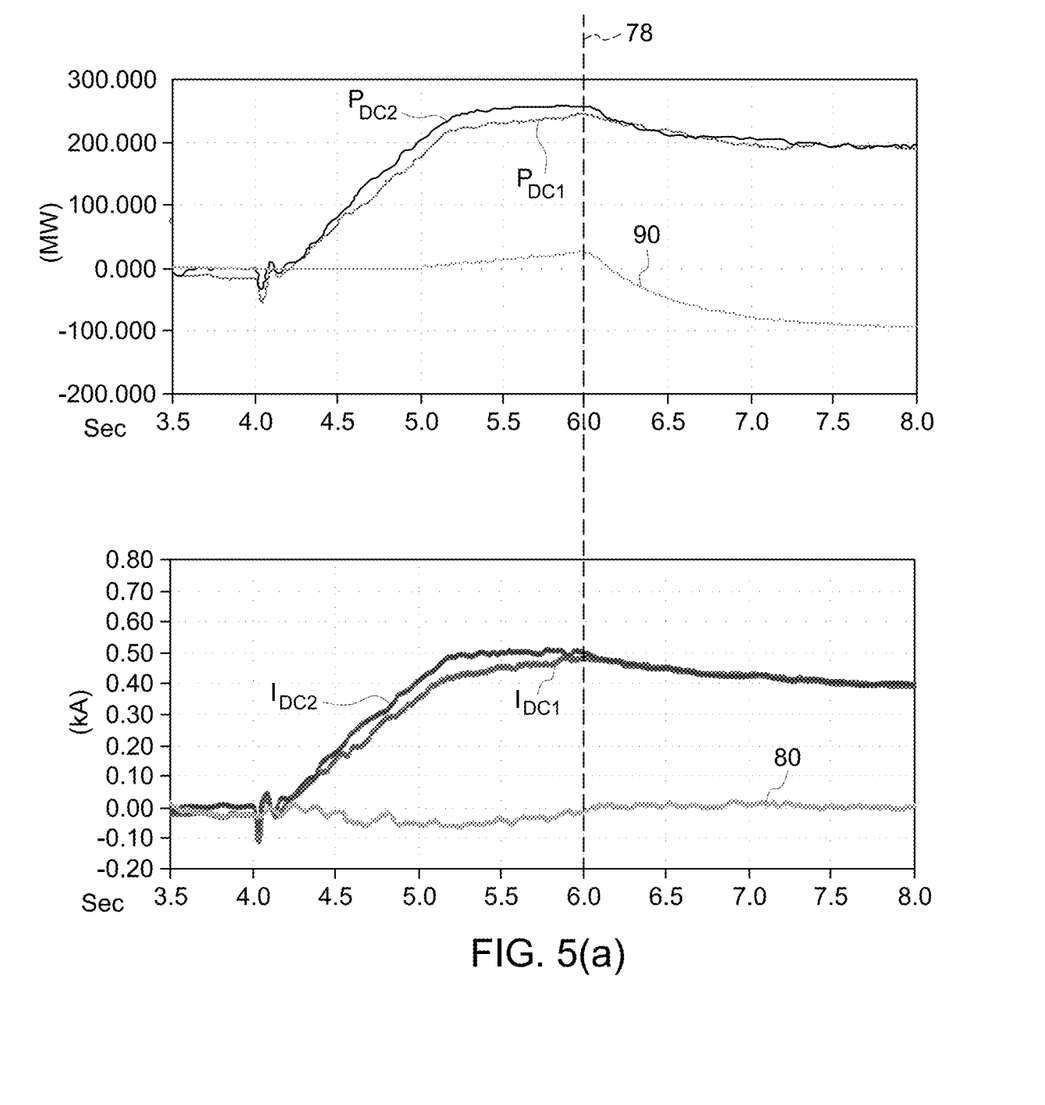
FIGS. 5(a) and 5(b) illustrate different power exchanges with an upstream AC network forming a part of the bipole power transmission scheme shown in FIG. 1.

One example of how such a converter station controller 58 can be used, while operating the first converter station 12 in the current distribution mode 78, is illustrated in FIG. 5(*a*) which shows balanced DC currents $I_{DC1}$, $I_{DC2}$ and similar, balanced powers $P_{DC1}$, $P_{DC2}$ of about 200 MW flowing in the first and second transmission conduits 18, 20 (and a commensurate, essentially zero, return conduit current 80). Meanwhile approximately 100 MW of power is diverted from the first and second transmission conduits 18, 20, e.g. in the form of a rejected power portion 90, and is therefore forced to flow into the upstream AC network 82.

Figure 5B:
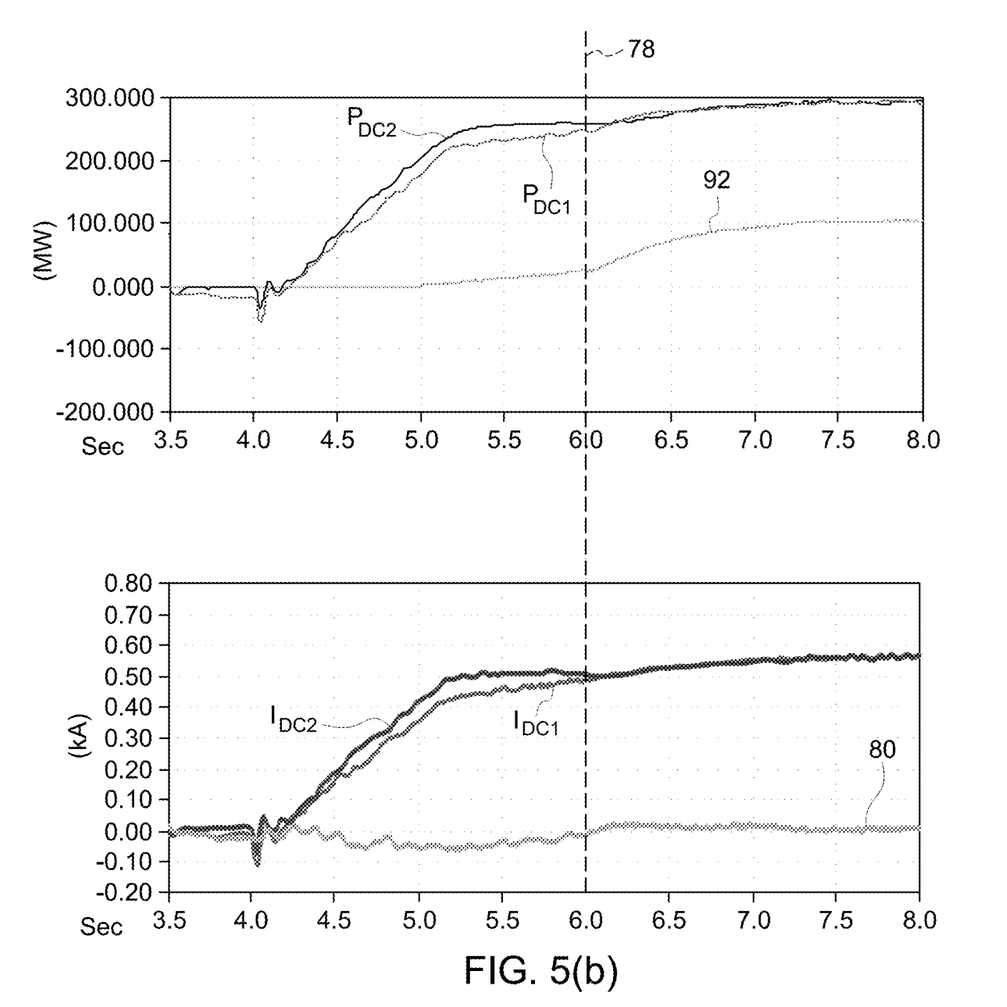

Another example is illustrated in FIG. 5(*b*) which again shows balanced DC currents $I_{DC1}$, $I_{DC2}$. However in contrast, approximately 100 MW of power is accepted from the upstream AC network 82, e.g. in the form of an absorbed power portion 92, and so larger, although still balanced, powers $P_{DC1}$, $P_{DC2}$ of about 250 MW flow into each the first and second transmission conduits 18, 20.

As an alternative to the foregoing, in other embodiments of the invention the converter station controller 58 may instead be programmed to adjust the total amount of power transferred from the power source 38 into the first and second transmission conduits 18, 20 by establishing a measured power source output, i.e. the actual measured power provided by the power source 38, and thereafter to adjust the total amount of power transferred from the power source 38 into the first and second transmission conduits 18, 20 to be a desired proportion of the measured power source output, i.e. such that the first and second power transmission conduits 18, 20 take a target proportion, e.g. 80%, of the power generated by the power source 38.

In each of the aforementioned embodiments of the invention, the converter station controller 58 preferably is additionally programmed to operate the first converter station 12 in a fault recovery mode prior to switching to operate the first converter station 12 in the current distribution mode after clearance of the fault.

In such a fault recovery mode, e.g. following a pole to ground fault in one of the first or second transmission conduits 18, 20, the converter station controller 58 will temporarily stop transmitting power via the affected transmission conduit 18, 20 so that the transmission conduit 18, 20 can be de-energised to facilitate clearance of the fault.

Figure 6:
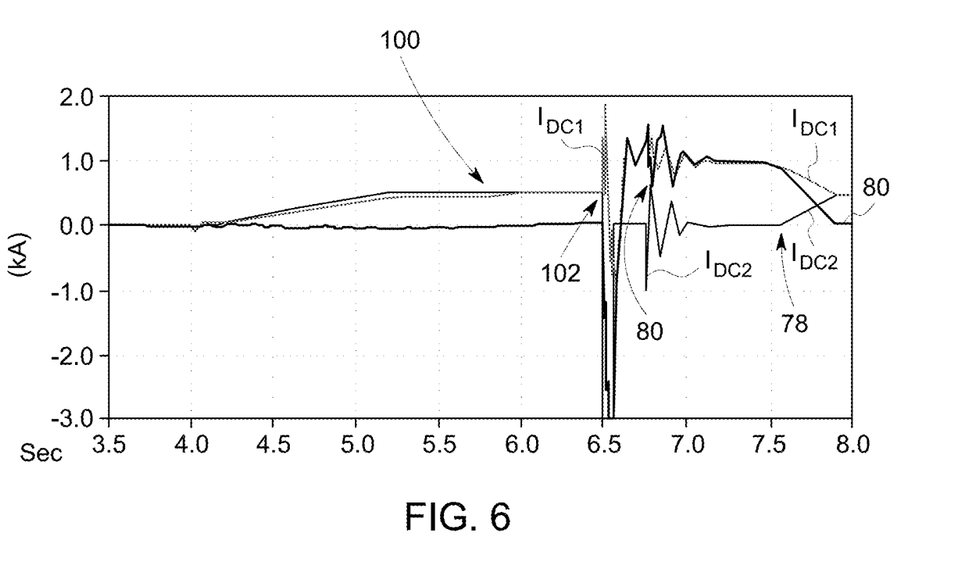
FIG. 6 illustrates operation of the first converter station in a fault recovery mode prior to operating in a current distribution mode following clearance of the fault.

The desirability of then being able to switch to operating the first converter station 12 in the current distribution mode after clearance of such a fault is illustrated in FIG. 6.

More particularly, FIG. 6 shows that pre-fault operation 100 of the first converter station 12 is characterised by balancing of the first and second DC currents $I_{DC1}$, $I_{DC2}$ between the first and second transmission conduits 18, 20.

When a fault occurs 102, e.g. in relation to the second transmission conduit 20, the second transmission conduit 20 is no longer able to transfer the second DC current $I_{DC2}$, but when the fault is detected the other healthy, i.e. first, transmission conduit 18 can be made to increase the first DC current $I_{DC1}$ it carries (up to a maximum safe level), and hence also increase the first power $P_{DC1}$ it transfers, to compensate for the loss of the faulted, second transmission conduit 20. In these circumstances, any power transfer that is beyond the capacity of the healthy, first transmission conduit 18 will have to be rejected, and hence will then flow into the upstream AC network 82 (when such an upstream AC network is included in the bipole power transmission scheme 10 of the invention).

During such a fault, the imbalance the first and second DC currents $I_{DC1}$, $I_{DC2}$, i.e. the increased first DC current $I_{DC1}$ and the essentially zero second DC current $I_{DC2}$, causes a significant return conduit current 80 to flow.

Once the fault has been cleared the first converter station 12 can be switched back to operating in the current distribution mode 78, whereby the first and second DC currents $I_{DC1}$, $I_{DC2}$ are again balanced between the first and second transmission conduits 18, 20, and the return conduit current 80 falls back to essentially zero.

We claim:

1. A bipole power transmission scheme comprising a first converter station positioned in-use remote from a second converter station, and first and second transmission conduits and a return conduit to in-use interconnect the first converter station with the second converter station and thereby permit the transfer of power between the first and second converter stations, the first converter station including:

a first power converter having a first DC terminal connected with the first transmission conduit, a second DC terminal connected with the return conduit, and at least one first AC terminal electrically connected with a point of common coupling for connection to an AC network element operating at a reference phase angle, the first power converter further having a first converter controller programmed to control the transfer of power between the first transmission conduit and the point of common coupling by having the first power converter provide a first AC voltage at the or each first AC terminal which is presented to the point of common coupling;

a second power converter having a third DC terminal connected with the return conduit, a fourth DC terminal connected with the second transmission conduit, and at least one second AC terminal electrically connected with the point of common coupling, the second power converter further having a second converter controller programmed to control the transfer of power between the second transmission conduit and the point of common coupling by having the second power converter provide a second AC voltage at the or each second AC terminal which is presented to the point of common coupling; and a converter station controller arranged in operative communication with each of the first and second converter controllers whereby the first and second power converters are controlled as grid forming converters such that the first and second AC voltages presented to the point of common coupling manage the AC frequency and AC voltage at the point of common coupling, the converter station controller being programmed to operate the first converter station in a current distribution mode in which the distribution of DC current between the first and second transmission conduits is controlled, the converter station controller when operating the first converter station in the current distribution mode being programmed to instruct the first converter controller to adjust the operating phase angle of the first AC voltage provided at the or each first AC terminal in a first direction relative to the reference phase angle at the point of common coupling and instruct the second converter controller to adjust the operating phase angle of the second AC voltage provided at the or each second AC terminal in a second direction opposite the first direction relative to the reference phase angle at the point of common coupling.

2. A bipole power transmission scheme according to claim 1, wherein the point of common coupling is connected with an AC network element in the form of a power source, the first converter controller is programmed to control the transfer of power from the power source to the first transmission conduit, and the second converter controller is programmed to control the transfer of power from the power source to the second transmission conduit.

3. A bipole power transmission scheme according to claim 2, wherein the power source has an upstream AC network connected in parallel therewith, and wherein the converter station controller is additionally programmed, while operating the first converter station in the current distribution mode, to adjust the total amount of power transferred from the power source into the first and second transmission conduits to control the power exchanged with the upstream AC network.

4. A bipole power transmission scheme according to claim 3, wherein the converter station controller is programmed to adjust the total amount of power transferred from the power source into the first and second transmission conduits by establishing a measured upstream AC network power transfer and adjusting the total amount of power transferred from the power source into the first and second transmission conduits to drive the measured upstream AC network power transfer to a desired magnitude.

5. A bipole power transmission scheme according to claim 3, wherein the converter station controller is programmed to adjust the total amount of power transferred from the power source into the first and second transmission conduits by establishing a measured power source output and adjusting the total amount of power transferred from the power source into the first and second transmission conduits to be a desired proportion of the measured power source output.

6. A bipole power transmission scheme according to claim 1, wherein the converter station controller is programmed to determine the extent of operating phase angle adjustment in each of the first and second directions.

7. A bipole power transmission scheme according to claim 6, wherein the converter station controller determines the extent of operating phase angle adjustment in each of the first and second directions according to a desired sharing factor.

8. A bipole power transmission scheme according to claim 7, wherein the converter station controller:

(i) establishes a first reference current the first power converter is required to provide to the first transmission conduit by applying the desired sharing factor to a sum of measured first and second transmission conduit currents and thereafter establishes a first change instruction for the first power converter based on a comparison of the first reference current with the measured first transmission conduit current; and (ii) establishes a second reference current the second power converter is required to provide to the second transmission conduit by applying a complementary sharing factor to the sum of measured first and second transmission conduit currents and thereafter establishes a second change instruction for the second power converter based on a comparison of the second reference current with the measured second transmission conduit current.

9. A bipole power transmission scheme according to claim 8, wherein the complementary sharing factor is selected to maintain the total amount of power transfer between the point of common coupling and the first and second transmission conduits at the same level during operation of the first converter station in the current distribution mode as the level of power transfer prior to operation of the first converter station in the current distribution mode.

10. A bipole power transmission scheme according to claim 6, wherein the converter station controller determines the extent of operating phase angle adjustment in each of the first and second directions by establishing a measured return conduit current and driving the measured return conduit current to a desired magnitude.

11. A bipole power transmission scheme according to claim 1, wherein the converter station controller is additionally programmed to operate the first converter station in a fault recovery mode and switches to operate the first converter station in the current distribution mode after clearance of the fault.

12. A method of operating a bipole power transmission scheme comprising a first converter station positioned in-use remote from a second converter station, and first and second transmission conduits and a return conduit to in-use interconnect the first converter station with the second converter station and thereby permit the transfer of power between the first and second converter stations, the first converter station including:

a first power converter having a first DC terminal connected with the first transmission conduit, a second DC terminal connected with the return conduit, and at least one first AC terminal electrically connected with a point of common coupling for connection to an AC network element operating at a reference phase angle, the first power converter further having a first converter controller programmed to control the transfer of power between the first transmission conduit and the point of common coupling by having the first power converter provide a first AC voltage at the or each first AC terminal which is presented to the point of common coupling;

a second power converter having a third DC terminal connected with the return conduit, a fourth DC terminal connected with the second transmission conduit, and at least one second AC terminal electrically connected with the point of common coupling, the second power converter further having a second converter controller programmed to control the transfer of power between the second transmission conduit and the point of common coupling by having the second power converter provide a second AC voltage at the or each second AC terminal which is presented to the point of common coupling; and a converter station controller arranged in operative communication with each of the first and second converter controllers whereby the first and second power converters are controlled as grid forming converters such that the first and second AC voltages presented to the point of common coupling manage the AC frequency and AC voltage at the point of common coupling, the method comprising the step of operating the first converter station in a current distribution mode in which the distribution of DC current between the first and second transmission conduits is controlled by having the converter station controller instruct the first converter controller to adjust the operating phase angle of the first AC voltage provided at the or each first AC terminal in a first direction relative to the reference phase angle at the point of common coupling and instruct the second converter controller to adjust the operating phase angle of the second AC voltage provided at the or each second AC terminal in a second direction opposite the first direction relative to the reference phase angle at the point of common coupling.

* * * * *